(12) United States Patent
Yukawa et al.

(10) Patent No.: US 8,223,416 B2
(45) Date of Patent: Jul. 17, 2012

(54) SCANNING OPTICAL APPARATUS

(75) Inventors: Hiroki Yukawa, Nagoya (JP); Hiroyuki Ominato, Nagoya (JP); Hitoshi Fujino, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/072,747

(22) Filed: Mar. 27, 2011

(65) Prior Publication Data

US 2012/0002261 A1    Jan. 5, 2012

(30) Foreign Application Priority Data

Jun. 30, 2010   (JP) .................................. 2010-149124

(51) Int. Cl.
*G02B 26/08* (2006.01)
(52) U.S. Cl. .................................. 359/204.1; 359/205.1
(58) Field of Classification Search ............... 359/204.1, 359/207.1–207.6, 212.1, 216.1, 205.1
See application file for complete search history.

(56) References Cited

U.S. PATENT DOCUMENTS 5,818,505 A    10/1998   Kato
2008/0158331 A1*  7/2008  Kato ............................ 347/259

FOREIGN PATENT DOCUMENTS

JP    H08-297256 A    11/1996

* cited by examiner

*Primary Examiner* — Euncha Cherry
(74) *Attorney, Agent, or Firm* — Baker Botts L.L.P.

(57) ABSTRACT

In a scanning optical apparatus, light emitted from each of a plurality of light sources is converted by a first optical element into a beam of light, which in turn is converted by a second optical element into a linear image extending in a main scanning direction incident on a deflecting mirror at which the beams of light are deflected in the main scanning direction. A third optical element configured to convert the beams from the deflecting mirror into spot-like images is a single lens, and each of opposite lens surfaces thereof has a curvature in a sub-scanning direction varying continuously from a position corresponding to an optical axis thereof outward in the main scanning direction in such a manner that MTF values in a sub-scanning direction of an image formed on the scanned surface vary less with image height.

1 Claim, 5 Drawing Sheets

FIG. 4

COEFFICIENTS AND CHARACTERISTICS REPRESENTING SHAPES OF LENS SURFACES

| WAVELENGTH | $\lambda$ [nm] | 788 |
|---|---|---|
| REFRACTIVE INDEX OF F$\theta$ LENS | n | 1.503 |
| ANGLE OF INCIDENCE ON POLYGON MIRROR | $\theta i$ [deg] | 80 |
| DISTANCE FROM POLYGON MIRROR TO F$\theta$ LENS | e [mm] | 44.5 |
| THICKNESS AT CENTER OF F$\theta$ LENS | d [mm] | 11 |
| DISTANCE FROM F$\theta$ LENS TO SCANNED SURFACE | fb [mm] | 133.4 |
| F$\theta$ COEFFICIENT | k [mm] | 160.0 |
| MAXIMUM SCAN RANGE | [mm] | ±110.0 |
| MAXIMUM SCAN ANGLE OF POLYGON MIRROR | $\theta$max [deg] | 39.4 |
| DISTANCE FROM POLYGON MIRROR TO NATURAL CONVERGENT POINT | fc [mm] | 414.6 |
| NUMERICAL APERTURE IN SUB-SCANNING DIRECTION | NA | 7.380E-03 |

| FIRST SURFACE (INCIDENT SIDE) | | SECOND SURFACE (EXIT SIDE) | |
|---|---|---|---|
| $c_y$ | 1.0919.E-02 | $c_y$ | 2.616E-03 |
| cc | -18.728 | cc | -498.658 |
| $A_4$ | -7.168E-007 | $A_4$ | -1.616E-006 |
| $A_6$ | 2.120E-010 | $A_6$ | 4.759E-010 |
| $A_8$ | 1.686E-014 | $A_8$ | -1.067E-013 |
| $A_{10}$ | -2.267E-017 | $A_{10}$ | 1.981E-017 |
| $A_{12}$ | 3.757E-021 | $A_{12}$ | -2.152E-021 |
| 1/r | -4.559.E-02 | 1/r | -8.228.E-02 |
| $B_2$ | 3.410E-004 | $B_2$ | 1.738E-004 |
| $B_4$ | 5.068E-007 | $B_4$ | -3.054E-008 |
| $B_6$ | -1.152E-009 | $B_6$ | -1.207E-010 |
| $B_8$ | 9.845E-013 | $B_8$ | 9.827E-014 |
| $B_{10}$ | -3.858E-016 | $B_{10}$ | -2.809E-017 |
| $B_{12}$ | 5.629E-020 | $B_{12}$ | 2.181E-021 |
| LENS SHIFT AMOUNT | | D1 [mm] | 0.58 |
| LENS TILT AMOUNT | | $\beta 1$ [deg] | 0.2 |
| LENS SURFACE SHIFT AMOUNT | | D2 [mm] | 0.062 |
| LENS SURFACE TILT AMOUNT | | $\beta 2$ [deg] | 0.39 | ns # SCANNING OPTICAL APPARATUS

CROSS-REFERENCE TO RELATED APPLICATION(S)

This application claims priority from Japanese Patent Application No. 2010-149124 filed on Jun. 30, 2010, the disclosure of which is incorporated herein by reference in its entirety.

TECHNICAL FIELD

The present invention relates to a scanning optical apparatus suitable for use in an electrophotographic image forming apparatus.

BACKGROUND ART

In a multibeam scanning optical apparatus including a plurality of light sources for scanning a plurality of lines at the same time, an f-theta (fθ) lens may be designed to have lens surfaces shaped appropriately so that a compact and high-precision image forming apparatus can be realized. Specifically, in designing the shape of f-theta lens, f-numbers may be configured to satisfy the condition: $F_{min}/F_{max} > 0.9$ where $F_{max}$ and $F_{min}$ indicate the maximum and minimum values, respectively, of the f-numbers of beams of light incident on a scanned surface in a sub-scanning direction.

In an optical system involving aberrations, unless an adequate consideration is given to the effect of the aberrations, distortions such as curvatures of field would become nonnegligible in view of the loss of image quality. Even if variations in f-numbers could be reduced as described above, variations in resolutions of images formed on the scanned surface could be a possible cause of undesirable unevenness in the resulting image.

Under the circumstances, there is a need to provide an improved scanning optical apparatus which can achieve uniform exposure to light.

SUMMARY

In one aspect, a scanning optical apparatus is provided which comprises a plurality of individually modulated light sources; a first optical element configured to convert light emitted from each of the plurality of light sources into a beam of light; a second optical element configured to convert beams of light having passed through the first optical element into linear images extending in a main scanning direction; a deflecting mirror configured to deflect the beams of light having passed through the second optical element in the main scanning direction; and a third optical element configured to convert the beams of light having been deflected by the deflecting mirror into spot-like images to be focused on a scanned surface. The third optical element is a single lens having a pair of opposite lens surfaces each having an optical axis. Each of the pair of opposite lens surfaces has a curvature in a sub-scanning direction varying continuously from a position corresponding to the optical axis thereof outward in the main scanning direction in such a manner that MTF values in a sub-scanning direction of an image formed on the scanned surface vary less with image height.

BRIEF DESCRIPTION OF THE DRAWINGS

The above aspect, its advantages and further features of the present invention will become more apparent by describing in detail illustrative, non-limiting embodiments thereof with reference to the accompanying drawings, in which:

FIG. 4 is a table showing characteristics and coefficients representative of the shapes of lens surfaces of the f-theta lens configured according to one exemplary embodiment.

DESCRIPTION OF EMBODIMENTS

A detailed description will be given of illustrative embodiments of the present invention with reference made to the drawings where necessary.

Figure 1:
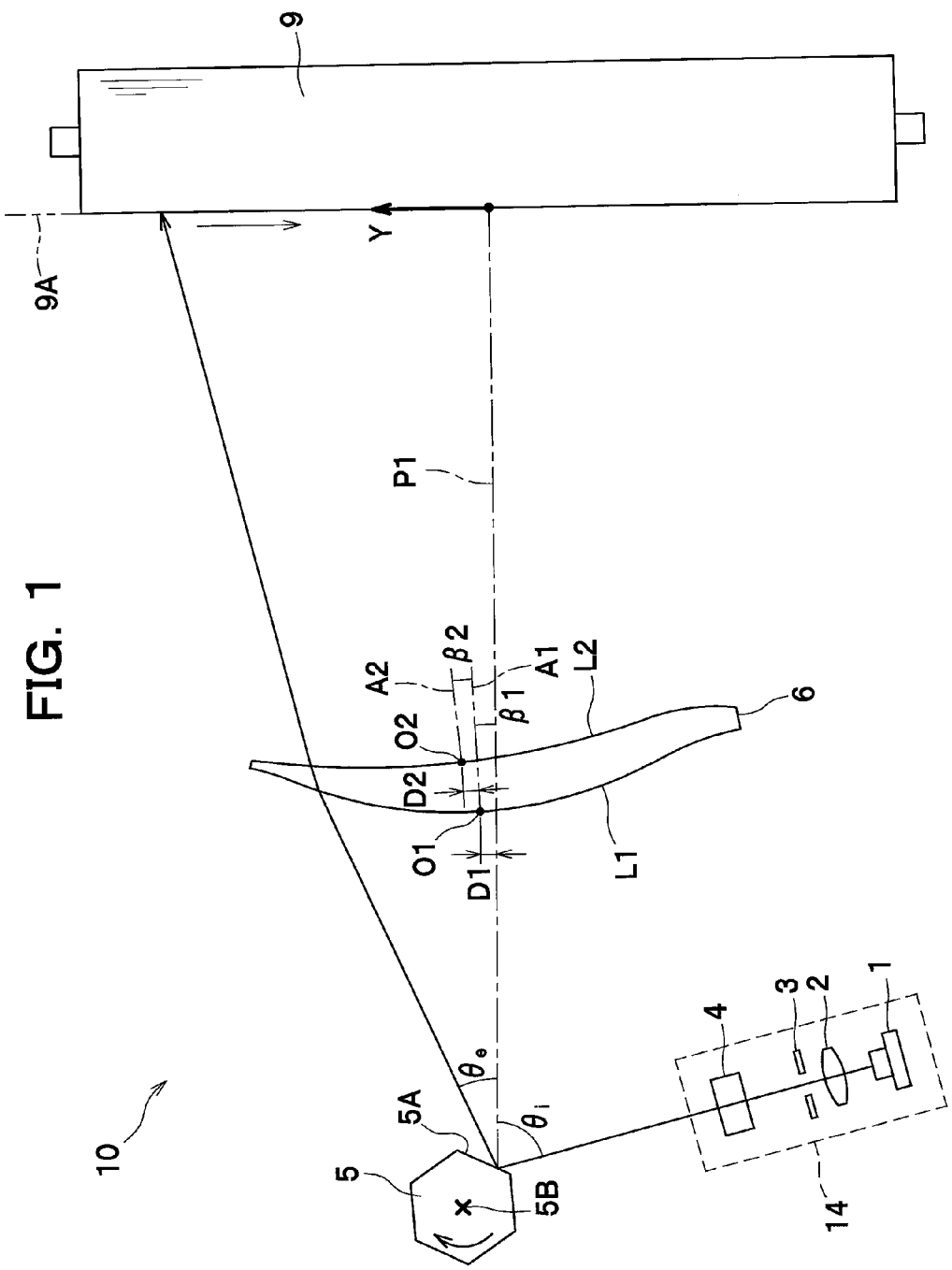
FIG. 1 is a sectional view of a scanning optical apparatus according to one exemplary embodiment taken along a main scanning plane.

As seen in FIG. 1, a scanning optical apparatus 10 according to one exemplary embodiment includes an illumination optical system 14, a polygon mirror 5 as an example of a deflecting mirror, and an f-theta lens (fθ lens) 6 as an example of a third optical element, so that a laser beam emitted from the illumination optical system 14 is converted into a spot-like image with which a peripheral surface 9A of a photoconductor drum 9 is scanned.

The illumination optical system 14 includes a semiconductor laser 1, a collimating lens 2 as an example of a first optical element, an aperture stop 3, and a cylindrical lens 4 as an example of a second optical element.

Figure 2:
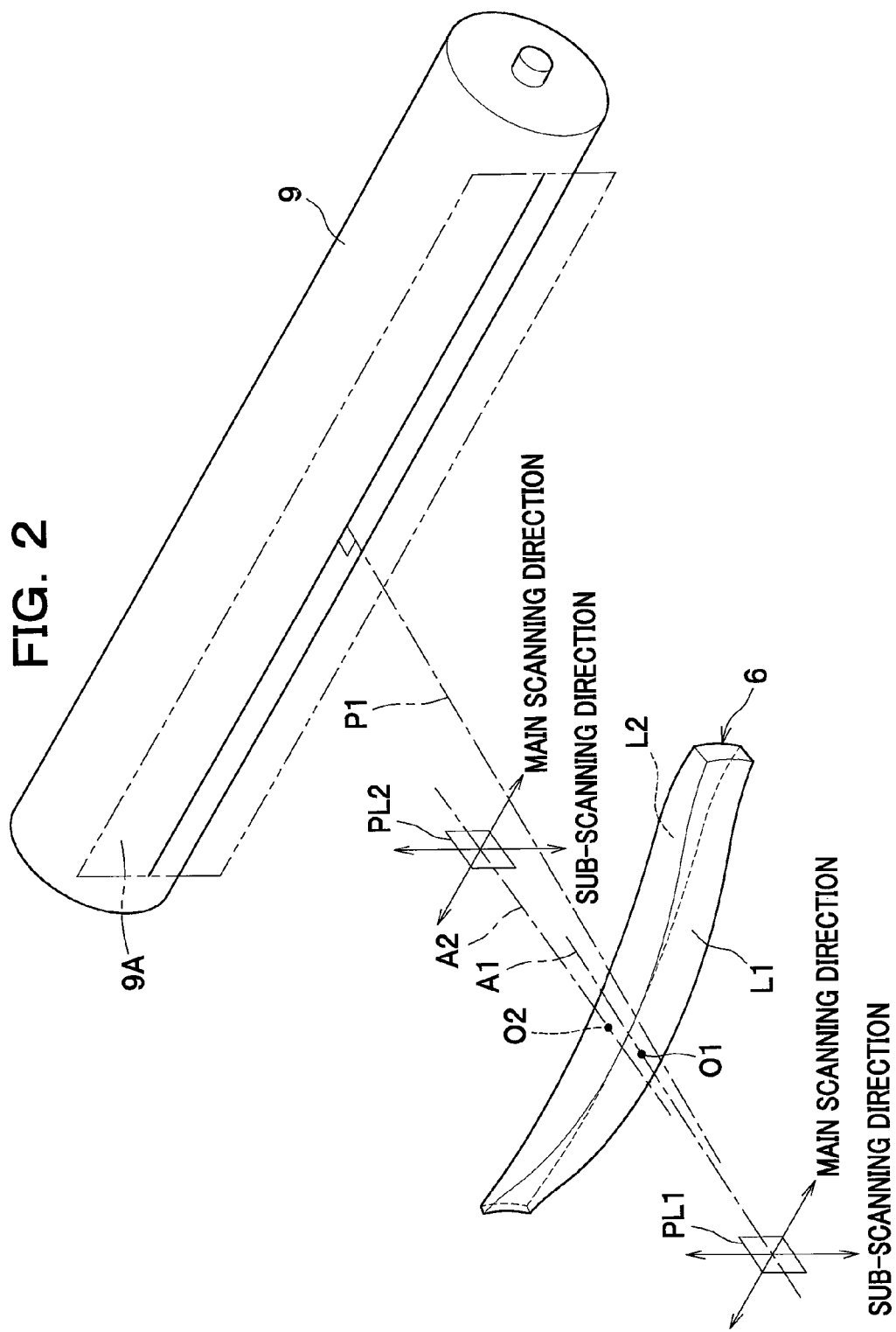
FIG. 2 is a perspective view for explaining a main scanning direction and a sub-scanning direction for lens surfaces of an f-theta lens.

The semiconductor laser 1 includes a plurality of light sources arrayed in a sub-scanning direction (perpendicular to a main scanning direction; i.e., a direction of an axis of rotation of the polygon mirror 5 in FIG. 1; see also FIG. 2). In this exemplary embodiment, two light-emitting elements (not shown) are provided which are configured to be independently modulated for two scanning lines of images to be formed on the surface 9A.

The collimating lens 2 is a lens configured to convert laser light emitted from the semiconductor laser 1 into a beam of light that is a parallel or nearly parallel beam. It is to be understood, however, that the first optical element consistent with the present invention is not limited to such a collimating lens but may be any other kind of coupling lens configured to convert light into a predetermined beam of light which may be either of a parallel beam, a converging beam or a slightly diverging beam.

The aperture stop 3 is a member having an opening which determines a diameter of each beam of light formed by the collimating lens 2.

The cylindrical lens 4 is a lens configured to convert each beam of light having passed through the collimating lens 2 and the aperture stop 3 into a linear image extending in the main scanning direction on a specular surface 5A of the polygon mirror 5.

The polygon mirror 5 has a plurality of specular surfaces 5A disposed equidistantly from an axis 5B of rotation of the polygon mirror 5; the polygon mirror 5 shown in FIG. 1 has six specular surfaces 5A. The polygon mirror 5 spins at a constant rotational speed about the axis of rotation 5B and reflects and deflects beams of light having passed through the cylindrical lens 4 in the main scanning direction. The term "main scanning direction" used herein is defined as a direction of deflection of a beam of light.

The scanning apparatus 10 includes only one f-theta lens 6. The f-theta lens 6 is configured to convert the beams of light having been reflected and thus deflected by the polygon mirror 5 into spot-like images to be focused on the surface 9A. The f-theta lens 6 is also configured to correct an optical face tangle error of each specular surface 5A of the polygon mirror 5. The f-theta lens 6 has f-theta characteristics such that each beam of light deflected at a constant angular velocity by the polygon mirror 5 is converted into a beam of light that scans the surface 9A at a constant linear velocity. The f-theta lens 6 has a pair of opposite lens surfaces, namely, an incident-side (polygon mirror 5 side) lens surface L1 and an exit-side (surface 9A side) lens surface L2. The lens surfaces L1, L2 are aspheric in the main scanning plane, and are both toric surfaces. The curvature of each lens surface L1, L2 in a sub-scanning plane (cross section perpendicular to the main scanning direction) varies continuously and symmetrically from a position corresponding to an optical axis thereof (a first optical axis A1 of the lens surface L1, a second optical axis A2 of the lens surface L2) outward in the main scanning direction within an effective region. It is however to be understood that a symmetrical profile of each lens surface L1, L2 in the main scanning direction with respect to its optical axis A1, A2 is not a requisite in view of the present invention.

In this embodiment, each lens surface L1, L2 can be expressed in any form without limitation. For example, when the intersection point O1 between the lens surface L1 of the f-theta lens 6 and the first optical axis A1 thereof and an intersection point O2 between the lens surface L2 of the f-theta lens 6 and the second optical axis A2 thereof are taken as origins, the optical axis directions are taken as z-axes, and axes orthogonal to the optical axes A1, A2 in the main scanning plane are taken as y-axes, the meridional direction corresponding to the main scanning direction is given by the following formula:

$$z = \frac{c_y y^2}{1 + \sqrt{1 - (1 + cc)c_y^2 y^2}} + A_4 y^4 + A_6 y^6 + A_8 y^8 + A_{10} y^{10} + A_{12} y^{12} \quad (1)$$

where $A_4, \ldots, A_{12}$, $c_y$, cc are constants.

The sagittal direction corresponding to the sub-scanning direction is given by the following formula:

$$s = \frac{c_x(y) x^2}{1 + \sqrt{1 - c_x(y)^2 x^2}} \quad (2)$$

Herein, the radius r' of curvature in the sub-scanning direction at a point on the y-coordinate of each lens surface L1, L2 is given, with a radius r of curvature in the sub-scanning direction on the corresponding optical axis A1, A2, as follows:

$$r' = 1/c_x(y) = r(1 + B_2 y^2 + B_4 y^4 + B_6 y^6 + B_8 y^8 + B_{10} y^{10} + B_{12} y^{12}) \quad (3)$$

where $B_2, \ldots, B_{12}$ are constants.

The lens surface L1 has a shape symmetric with respect to the sub-scanning plane PL1 (see FIG. 2) containing the optical axis thereof (the first optical axis A1). The lens surface L2 also has a shape symmetric with respect to the sub-scanning plane PL2 (see FIG. 2) containing the optical axis thereof (the second optical axis A2). With this configuration, the lens surfaces L1, L2 can be fabricated easily. The lens surfaces L1, L2 may be fabricated for example by plastic injection molding or glass molding, using a mold having cavity surfaces of shapes reversely contoured to fit the shapes of the lens surfaces L1, L2, respectively. Since each lens surface L1, L2 has a shape symmetric with respect to the sub-scanning plane PL1, PL2 containing the optical axis thereof. A1, A2, a correction made in making the mold and an inspection made to the shape of the mold and the castings (final molded products) can be carried out easily.

Figure 3:
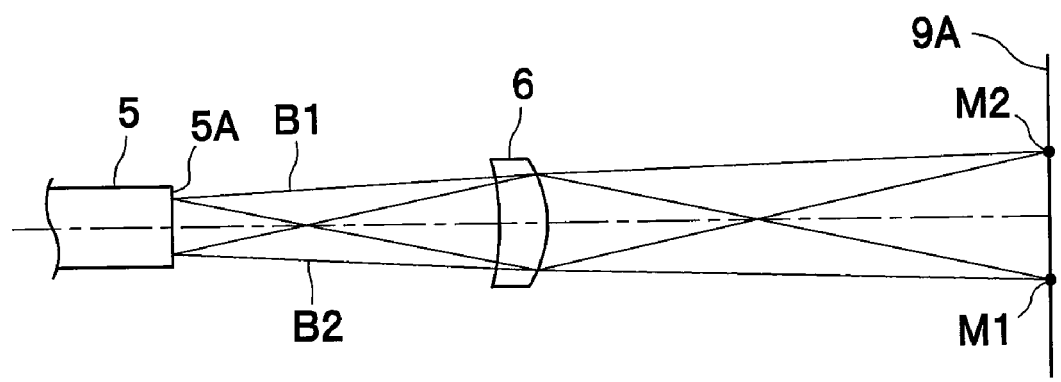
FIG. 3 is a sectional view taken along a sub-scanning plane, for illustrating paths traveled by beams of light reflected off a polygon mirror.

As shown in FIG. 3, two beams of light B1, B2 striking the specular surface 5A of the polygon mirror 5 in the form of linear images extending in the main scanning direction are directed by the polygon mirror 5 toward the f-theta lens 6, and converted by the f-theta lens 6 into spot-like images M1, M2 focused on the surface 9A. In this way, the scanning optical apparatus 10 causes the two spot-like images M1, M2 to sweep across the surface 9A in the main scanning direction to thereby draw two scanning lines simultaneously in a single scanning operation in the main scanning direction.

In all practical cases, each image M1, M2 formed on the surface 9A may fail to have the shape of a perfect dot due to aberrations and f-number errors of the collimating lens 2, the cylindrical lens 4 and the f-theta lens 6, which would result in blurring such that each image M1, M2 is formed as a dot of a specific area with an uneven intensity distribution. For the spot-like images M1, M2 to be formed on the surface 9A, customarily, those which are sharper in outline and higher in resolution may be considered to be preferable. However, good appearance, as a whole, of images formed in the image forming apparatus may be accomplished more likely by unvarying (evenly achieved) resolution rather than merely high resolution.

The resolution may be indicated by a modulated transfer function or MTF. In the present embodiment, each of the pair of opposite lens surfaces L1, L2 of the f-theta lens 6 has a curvature in a sub-scanning direction varying continuously from a position corresponding to the optical axis thereof (first optical axis A1, second optical axis A2) outward in the main scanning direction in such a manner that MTF values in the sub-scanning direction of an image M1, M2 formed on the scanned surface 9A vary less with image height Y.

The degree of permissible variation of the MTF values in the sub-scanning direction for image heights Y may preferably be conditioned such that a maximum MTF value $MTF_{max}$ and a minimum MTF value $MTF_{min}$ satisfy the following inequality:

$$(MTF_{max} - MTF_{min})/MTF_{min} \leq (2\beta_{max} - 2\beta_{min} - \sin \beta_{max} + \sin \beta_{min})/(2\beta_{min} - \sin \beta_{min}) \quad (4)$$

where $\beta_{max} = \cos^{-1}(0.5 * \lambda * u/NA)$, $\beta_{min} = \cos^{-1}(0.55 * \lambda * u/NA)$, in which u indicates a spatial frequency determined for a dot pitch on the scanned surface 9A, NA indicates a numerical aperture in the sub-scanning direction of the f-theta lens 6, and λ indicates a wavelength of light emitted from each of the light sources of the semiconductor laser 1.

To fulfill the above condition represented by inequality (4), the scanning optical apparatus 10 of the present embodiment is adapted to optimize the arrangement of the illumination optical system 14, the polygon mirror 5 and the surface 9A to be scanned, the arrangement of the f-theta lens 6 relative to these components, and the shape of the f-theta lens 6. In this embodiment, as shown in FIG. 1, the first optical axis A1 of the lens surface L1 is inclined by an angle β1 with respect to the normal line P1 extending from a scanning center on the surface 9A to be scanned (i.e., the direction of travel of the beam of light to be incident on the surface 9A at right angles after being reflected off the polygon mirror 5), and the center of the lens surface L1 (i.e., the intersection point O1 between the first optical axis A1 and the lens surface L1) is shifted from the normal line P1 by a shift amount D1. Similarly, the second optical axis A2 of the lens surface L2 is inclined by an angle β2 with respect to the first optical axis A1, and the center of lens surface L2 (i.e., the intersection point O2 between the second optical axis A2 and the lens surface L2) is shifted from first optical axis A1 by a shift amount D2.

Figure 5:
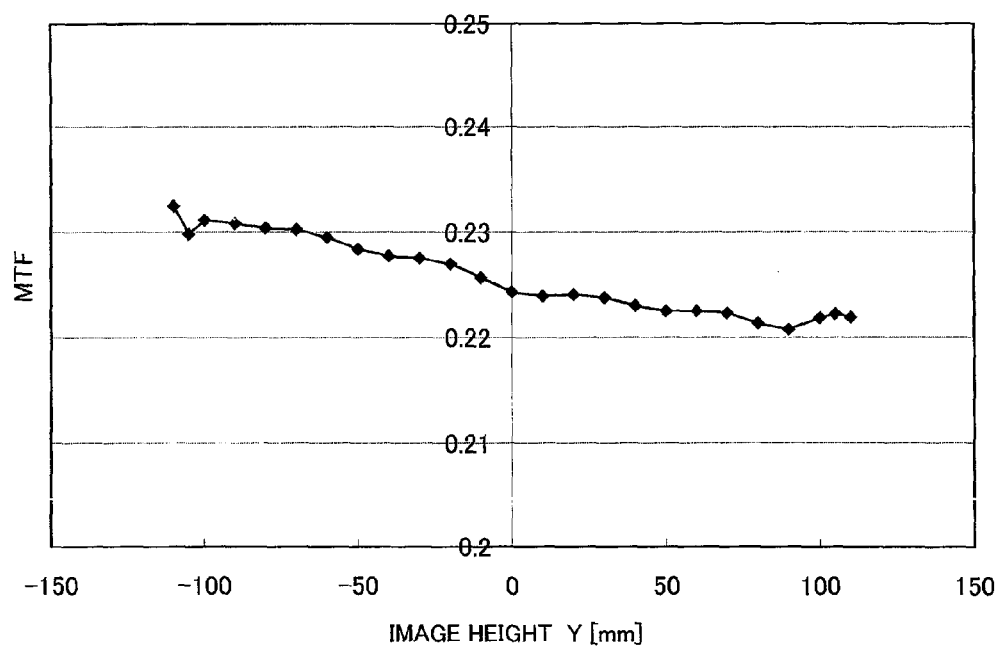
FIG. 5 is a graph showing a relationship between image height Y and MTF in the scanning optical apparatus according to one exemplary embodiment.

To show examples implemented in accordance with one or more aspects of the present invention where the lens surfaces L1, L2 are represented by the formulas (1)-(3), several coefficients defining the shapes of the lens surfaces L1, L2 and characteristics such as shift amounts D1, D2 and tilt angles β1, β2 of the lens surfaces L1, L2 are shown in FIG. 4. The relationship between the image height Y and the MTF value of the optical system having characteristics shown in FIG. 4 is graphically shown in FIG. 5.

With the scanning optical apparatus 10 including the f-theta lens 6 possessing the characteristics shown in FIG. 4 and other optics, the wavelength λ, numerical aperture N, spatial frequency u (determined for a dot pitch on the scanned surface) were determined as follows:

$$\lambda = 788 \text{ nm};$$

$$NA = 7.380E\text{-}03; \text{ and}$$

$$u = 11.8,$$

and thus, $\beta_{max}$ and $\beta_{min}$, were:

$$\beta_{max} = \cos^{-1}(0.5 * \lambda * u / NA) = 8.893\text{-}01, \text{ and}$$

$$\beta_{min} = \cos^{-1}(0.55 * \lambda * u / NA) = 8.052E\text{-}01; \text{ therefore}$$

$$(2\beta_{max} - 2\beta_{min} - \sin \beta_{max} + \sin \beta_{min})/(2\beta_{min} - \sin \beta_{min}) = 2.361E\text{-}01,$$

while $(MTF_{max} - MTF_{min})/MTF_{min} = 5.296E\text{-}02$ where MTF values were calculated using software, such as code V and ZEMAX. It has therefore been shown that the condition (4) was satisfied.

As described above, with the scanning optical apparatus 10 configured according to the present embodiment such that the curvature in the sub-scanning direction of each of the pair of lens surfaces L1, L2 varies continuously from a position corresponding to the optical axis thereof (the optical axis A1, A2) outward in a main scanning direction in such a manner that the condition (4) is satisfied, variations in resolutions as indicated by MTF values between scanning lines with positions along the main scanning direction (positions corresponding to image heights Y) are made smaller, and the uniformity of an entire area of images formed by illumination of multiple beams of light on the scanned surface 9A can be improved. In other words, the resolutions (as represented by MTF values) of images from the plurality of light sources are made uniform in an entire area on the scanned surface 9A in the main scanning direction, whereby unevenness in the images formed by exposure to light can be reduced to a desirably undistinguishable level. As a result, uniform exposure to light can be carried out in the main scanning direction, so that the quality images can be formed.

Although the illustrative embodiment of the present invention has been described above, the present invention is not limited to the above-described embodiments. Various modifications and changes may be made to the specific structures and arrangement without departing from the scope of the present invention. For example, in the present embodiment, the f-theta lens 6 is configured and arranged with the angle β1, β2 and the shift amounts D1, D2 set all at values other than zero (0) so as to satisfy the inequality (4); it is however to be understood that the inequality (4) may be satisfied even if one or more of these values are set at zero. The inequality (4) can be satisfied with all of the angles β1, β2 and the shift amounts D1, D2 set at zero, if the f-theta lens 6 is configured to have lens surfaces asymmetric with respect to the sub-scanning plane PL.

Although the polygon mirror 5 is employed as an example of a deflecting mirror in the above-described embodiment, a galvano mirror may be employed as such a deflecting mirror consistent with the present invention, instead. In this alternative embodiment, an arcsine lens may be employed as a third optical element, instead of the f-theta lens.

Although two light sources are arrayed in the sub-scanning direction in the above-described embodiment, three or more light sources may be arrayed in the sub-scanning direction in the scanning optical apparatus consistent with the present invention.

What is claimed is:

1. A scanning optical apparatus comprising:
   a plurality of individually modulated light sources;
   a first optical element configured to convert light emitted from each of the plurality of light sources into a beam of light;
   a second optical element configured to convert beams of light having passed through the first optical element into linear images extending in a main scanning direction;
   a deflecting mirror configured to deflect the beams of light having passed through the second optical element in the main scanning direction; and
   a third optical element configured to convert the beams of light having been deflected by the deflecting mirror into spot-like images to be focused on a scanned surface, the third optical element being a single lens having a pair of opposite lens surfaces each having an optical axis, each of the pair of opposite lens surfaces having a curvature in a sub-scanning direction varying continuously from a position corresponding to the optical axis thereof outward in the main scanning direction in such a manner that MTF values in a sub-scanning direction of an image formed on the scanned surface vary less with image height,
   wherein MTF is a modulated transfer function, the values of which represent resolutions of the image, and
   wherein a curvature of the third optical element in the sub-scanning direction varies such that a maximum MTF value $MTF_{max}$ and a minimum MTF value $MTF_{min}$ satisfy the following inequality:

$$(MTF_{max} - MTF_{min})/MTF_{min} \leq (2\beta_{max} - 2\beta_{min} - \sin \beta_{max} + \sin \beta_{min})/(2\beta_{min} - \sin \beta_{min})$$

where $\beta_{max} = \cos^{-1}(0.5 * \lambda * u / NA)$, $\beta_{min} = \cos^{-1}(0.55 * \lambda * u / NA)$, in which u indicates a spatial frequency determined for a dot pitch on the scanned surface, NA indicates a numerical aperture in the sub-scanning direction of the third optical element, and λ indicates a wavelength of light emitted from each of the plurality of light sources.

* * * * *